H. GLASS.

Wringing-Machines.

No. 5,265.

Reissued Feb. 4, 1873.

Attest:

B. R. Somes,

Wm. Henderson

Inventor:

Herman Glass,

By Bailey W. & K. Mac Cord

Glasgow,

Per Somes & Co.

Attorneys

A.M. PHOTO-LITHOGRAPHIC CO. N.Y. (OSBORNE'S PROCESS.)

UNITED STATES PATENT OFFICE.

HEMAN GLASS, OF HONEOYE FALLS, N. Y., ASSIGNOR, BY MESNE ASSIGNMENTS, TO BAILEY WASHING AND WRINGING MACHINE COMPANY.

IMPROVEMENT IN WRINGING-MACHINES.

Specification forming part of Letters Patent No. 39,141, dated July 7, 1863; reissue No. 5,265, dated February 4, 1873.

*To all whom it may concern:*

Be it known that HEMAN GLASS, of Honeoye Falls, in the county of Monroe and State of New York, invented certain Improvements in Clothes-Wringers, (which were assigned, by mesne assignments, to the BAILEY WASHING AND WRINGING MACHINE COMPANY, a corporation doing business in Woonsocket, in the county of Providence and State of Rhode Island,) of which the following is a specification:

This improved clothes-wringer is of that class in which the clothes are passed between elastic rollers for expressing the water, and which are intended to be readily adjustable to and removable from the side of the tub containing the clothes to be wrung. The invention consists in the peculiar construction and combination of parts, as hereinafter more specifically set forth.

Figure 1:
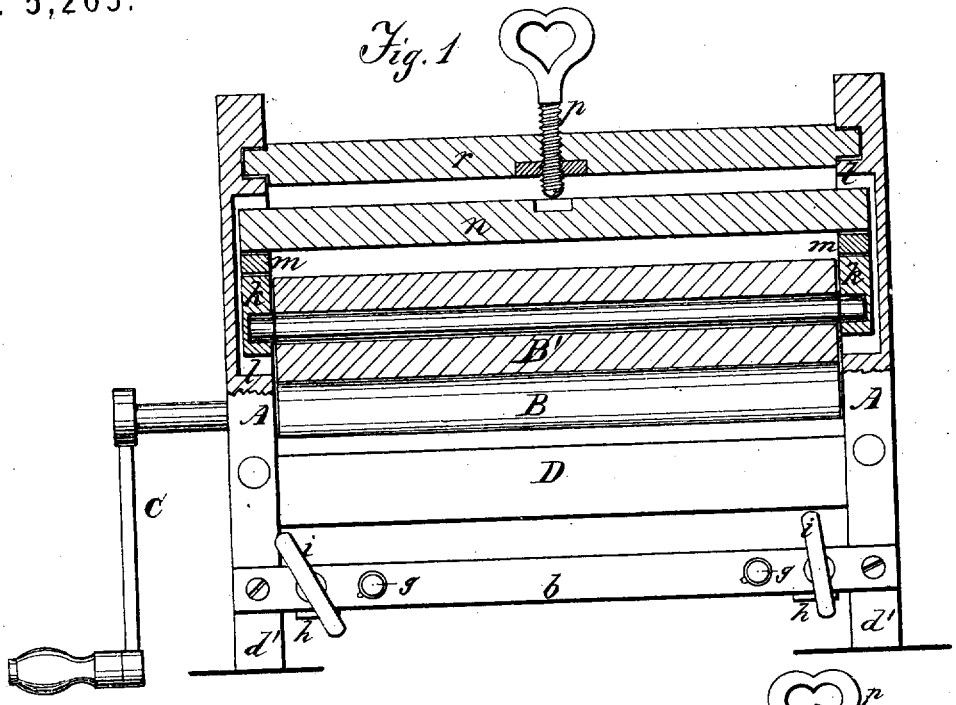
Figure 2:
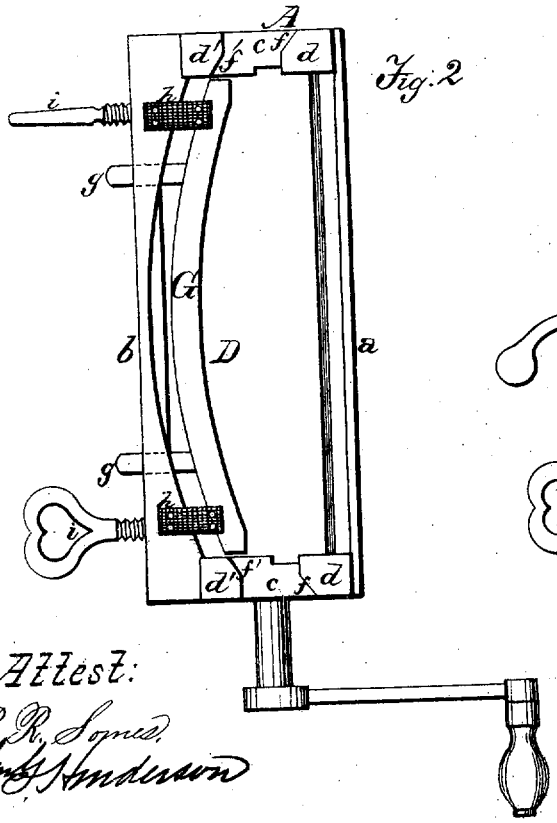
Figure 3:
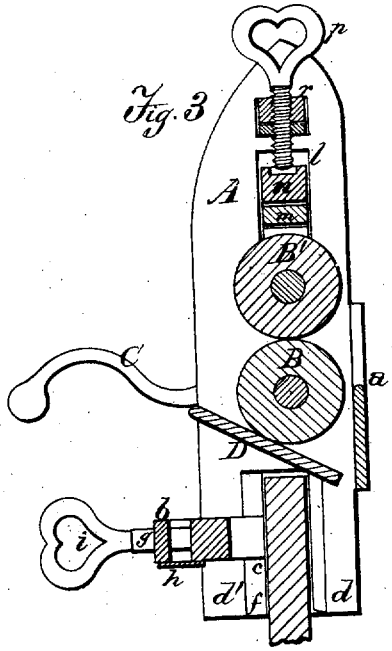

Figure 1 is a front elevation of this improved clothes-wringer, the upper portion being shown in section. Fig. 2 is a bottom view of the same. Fig. 3 is a central transverse section, showing the device as applied to the side of a tub.

The same letters of reference are used in all the figures in the designation of identical parts.

The legs or end standards A A are substantially of the shape represented, being connected together on one side by a brace, *a*, and on the other by a cross-support, *b*, near the bottom. Between these standards are mounted two elastic rollers, B B′, the former rigid and provided with a winch, C, and the latter adjusting in the manner and by the means hereinafter described. The standards A A are of sufficient width to allow a central vertical opening or cut, *c*, to be made, thus forming shanks *d d′*, as shown. These openings are of the proper width and depth to receive the edge of the tub or receptacle to which the machine is applied. The edges of the shanks *d d′*, bounding the openings *c*, are preferably made beveling, the former on the outside and the latter on the inside, as represented at *f f′*, Figs. 2 and 3, so as to adapt themselves to either a curved or straight sided receptacle. Inside the cross-support *b*, and on the same horizontal plane with it, is a clamp, G, whose curvature and flexibility are sufficient to allow it to be fitted to any tub. This clamp is connected with the support *b* by guide-pins *g g* sliding in holes therein, and by elastic strips *h h* on the bottom for producing the proper reaction of the clamp. The clamp is operated or clamped by thumb-screws *i i*, which pass through the cross-support *b* and rest against the former near its ends. The clamp G, being of curved form and somewhat flexible, easily adapts itself to a curved or straight sided receptacle. When tightened it holds the machine in place without much strain coming on it, the strain applying principally upon the standards. When the tightening-screws *i* are loosened the elastic strips *h h* draw the clamp back against the support *b*, so that it will not be in the way in fitting the machine in place. The pins *g g* guide the clamp in its forward and backward movements and hold it in place. Directly beneath the lower roller is situated an incline board, D, occupying nearly the whole space between the standards, and may occupy more or less, if desired. This board is so inclined that the water which is expressed from the clothes, falling upon it, runs back into the tub, while the clothes themselves will pass outward over the elevated end and be thrown clear of the tub outside. The journals of the upper adjusting elastic roller B′ bear in sliding blocks *k k*, resting respectively in depressions or grooves *l l* of the standards of suitable length to allow the necessary adjustment. On top of each of these blocks is a rubber spring, *m*, and on these springs, extending from end to end, is a sliding follower, *n*, depressed by means of a central tightening-screw, *p*, passing through a rigid support, *r*.

What is claimed as the invention is—

1. In a clothes-wringer having rubber rollers, an adjustable, curved, flexible clamp for the purpose of attaching said wringer to a tub or other receptacle.

2. In a clothes-wringer having rubber rollers, an adjustable curved clamp, as described, operated by means of set-screws.

3. In a clothes-wringer having rubber rollers, a curved clamp, in combination with set-screws and supporting-standards, or their equivalent, substantially as described.

4. In a clothes-wringer having rubber rollers, a curved clamp and set-screws, in combination with elastic strips or equivalent means for drawing back the clamp when loosed from the tub or receptacle.

5. The standards A A, having central vertical openings or cuts in their lower ends, when portions of the sides of the opening in each standard are beveled so as to conform to the curvature of a circular tub, while other portions remain parallel with the length of the machine and render it adjustable also to a straight-sided receptacle, in combination with the clamp G, substantially as shown and described.

6. A device for clamping a clothes-wringer to a tub or other receptacle, consisting of a curved clamp, G, set-screws *i*, cross-piece *b* or equivalent support, guide-pins *g*, elastic strips *h* or their equivalents, and standards A, substantially as described.

In witness whereof the said corporation has hereunto set its hand by its duly authorized officer in presence of two subscribing witnesses BAILEY WASHING AND WRINGING MACHINE CO.,
By S. A. BAILEY, *Gen. Agt.*

Witnesses:
A. GOODRICH FAY,
J. H. DASKAM.